(12) United States Patent
Eigel-Danielson

(10) Patent No.: US 6,301,580 B1
(45) Date of Patent: Oct. 9, 2001

(54) ADAPTIVE PROGRESS INDICATOR

(75) Inventor: Victoria Eigel-Danielson, Monument, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/228,670

(22) Filed: Jan. 12, 1999

(51) Int. Cl.$^7$ .................................................. G06F 17/00

(52) U.S. Cl. .................. 707/102; 707/10; 707/3; 707/104; 345/347

(58) Field of Search .................. 707/10, 200, 3, 707/104, 102; 345/347

(56) References Cited

U.S. PATENT DOCUMENTS

| | | | |
|---|---|---|---|
| 6,023,698 | * | 2/2000 | Lavey, Jr. et al. ...................... 707/10 |
| 6,072,490 | * | 6/2000 | Bates et al. ........................... 345/347 |
| 6,105,021 | * | 8/2000 | Berstis ..................................... 707/3 |

* cited by examiner

*Primary Examiner*—Kim Vu
*Assistant Examiner*—Cam-Y Truong

(57) ABSTRACT

A method for informing a user of the status of a computer operation having multiple concurrent tasks, comprising maintaining multiple variables, wherein each one of said multiple variables represents the progress of a corresponding one of said multiple tasks; comparing said multiple variables to determine a superior variable, wherein said superior variable is selected based upon at least one predetermined performance criterion; and outputting said superior variable at least once during said computer operation.

18 Claims, 10 Drawing Sheets

ADAPTIVE PROGRESS INDICATOR

FIELD OF THE INVENTION

This invention pertains to the field of computer graphical user interfaces, and more particularly to a graphical user interface that informs a user of the progress of a data search by providing the user with the greater of either the progress of a search of a data repository or the progress of filling a display repository, and which is dynamically updated to reflect the greater progress of the two.

BACKGROUND OF THE INVENTION

The amount of information available on a computer can sometimes be vast and overwhelming, making the task of just interpreting the information a major hurdle to overcome. Perhaps one of the most valuable tools a user can have in this respect is a tool that filters information for the user's ease of use and interpretation. A filtering tool could search through a buffer for pertinent data. The data can then be displayed in one-page increments to allow the user to interpret a subset of the pertinent data, where the actual search would temporarily halt when a page of data is acquired for display in a display repository.

It is also beneficial to provide a user with statistical information about the filtering process to keep the user informed of the progress of the search. A progress indicator could show a user a variable that represents, for example, the percentage of the data repository that has been searched. However, this variable alone does not give the user any indication that pertinent data is being found, even though the display repository could be accumulating data for display in one-page increments. Take, for example, a search inquiry where the percentage of a data repository searched variable sits at 30% and the percentage of display repository filled variable sits at 80%. A user would only see that 30% of the data repository has been searched, but realistically, the display repository almost has an entire page of display (80%). In this type of scenario, valuable time and effort could be wasted because a user might ultimately cancel the search inquiry out of impatience and frustration.

One solution is to show a user a progress indicator that represents, for example, the percentage of the display repository that has been filled. This solution has the advantage of letting the user know that some display data is forthcoming, regardless of how much is left to search of the data repository. As in the previous example, say that the percentage of data repository searched variable sits at 30% and the percentage of display repository filled sits at 80%. This time, a user would see that the display repository already has almost an entire page of display (80%), rather than only 30% of the data repository searched. In this scenario, the user would probably be willing to wait around for the remaining 20% of the display repository to get filled before the information gets displayed. A problem with this, however, is that if there is not a full page of data to display, the search will continue through the entire data repository. In the meantime, the percentage of display repository filled variable (i.e. 80%) can remain unchanged and the user is left with no indication as to whether the search is still in progress or if a computer error/failure has caused the search inquiry to stop.

Another solution is to provide a user with both variables, where the display repository filled variable lets the user know that display information is forthcoming, and the data repository searched variable informs the user that the search is still in progress. One drawback to this solution, however, is that it can be very confusing to the user where the progress indicator can continuously change and the user must weigh two variables against each other for a meaningful interpretation of the search status. A need exists, therefore, for a progress indicator that is:

adaptive, or continuously updated, both to the progress of a search of a data repository and to the progress of filling a display repository; and presented to a user in a simple and meaningful manner.

SUMMARY OF THE INVENTION

In a preferred embodiment of the present invention, the adaptive progress indicator displays the greater progress between a first variable that represents the progress of a search of a data repository and a second variable that represents the progress of filling a display repository. The greater progress between these two variables can be a maximum value as well as a minimum value. For instance, if the progress of a search of a data repository is measured by the number of kilobytes left to search the data repository, and the progress of filling a display repository is measured by the number of kilobytes needed to fill the display repository, then progress is made when the variables decrease. Therefore, the greater progress between the two variables is the minimum value between the two variables. Likewise, if the progress of a search of a data repository is measured by the number of kilobytes of data repository already searched, and the progress of filling a display repository is measured by the number of kilobytes of display repository already filled, then progress is made when the two variables increase, and the greater progress between the two variables is the maximum value between the two variables.

The variables can be expressed in terms of percentages, time elapsed, or time remaining, for example. In a search inquiry where the variables are expressed in terms of percentages, and progress of a search of a data repository is measured by the percentage of data repository searched, and progress of filling a display repository is measured by the percentage of display repository filled, the adaptive progress indicator displays a value that represents the maximum value between two variables that represent the progress of the two tasks, respectively.

The advantages of this invention can be explained with a simple example. Suppose that during a search inquiry, the percentage of data repository searched variable sits at 30%, and the percentage of display repository filled variable sits at 80%. The adaptive progress indicator will inform the user that 80% of the display repository has been filled. If no additional display data is found while the search continues through the data repository, the adaptive progress indicator will eventually change to reflect the percentage of data repository searched when this variable exceeds 80%. If the display data increases while the search continues through the data repository, the adaptive progress indicator will not change to reflect the percentage of data repository searched until and unless this variable exceeds the percentage of display repository filled variable. As a result, the user is continuously updated with just enough statistical information about the search to keep the user informed that progress is being made, without being overwhelmed and overburdened with constantly changing variables on the display.

The invention may also comprise an adaptive progress indicator that displays one of multiple variables that represent the progress of multiple tasks in a computer operation based upon at least one predetermined performance criterion.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF PREFERRED EMBODIMENTS

Figure 1A:
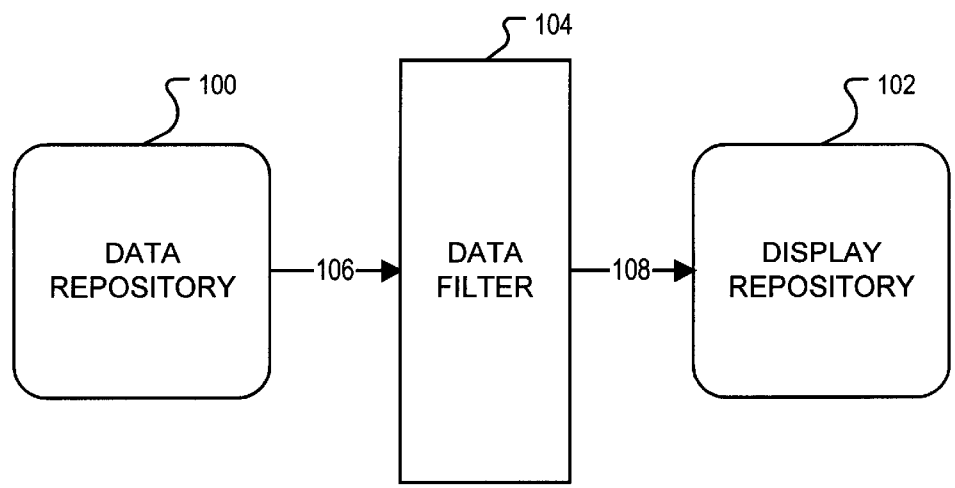
FIG. 1A illustrates a preferred embodiment, wherein a display repository is a physical repository.

The drawings, in general, illustrate an apparatus and a method using a dynamically processed indicator that informs a user of the status of a search inquiry by providing the user with the greater progress between a first variable that represents progress of a search of a data repository and a second variable that represents the progress of filling a display repository. The adaptive progress indicator apparatus may comprise one or more computer readable storage media 510 (FIG. 5); computer readable program code stored on the one or more computer readable storage media 510, wherein the program code causes a computer to maintain the progress of a search of data repository 200 in a first variable 500, wherein the data repository 200 comprises data; to maintain the progress of filling a display repository 206 in a second variable 502, wherein the display repository 206 comprises data read from the data repository 200 and the capacity of the display repository 206 is equal to a configurable measurement of data for output; to compare 504 the first variable 500 and the second variable 502 to determine a superior variable which is the greater progress of the two variables; and to output an adaptive progress indicator 508 that comprises the superior variable. The adaptive progress indicator method may comprise maintaining a first variable 500 (FIG. 5) representing the progress of a search of a data repository 200 during a search inquiry, wherein the data repository 200 comprises data; maintaining a second variable 502 representing the progress of filling a display repository 206 during the search inquiry, wherein the display repository 206 comprises data read from the data repository 200 and the capacity of the display repository 206 is equal to a configurable measurement of data for output; comparing 504 the first variable 500 and the second variable 502 to determine a superior variable that represents the greater progress of the two variables; and outputting an adaptive progress indicator 508 during the search inquiry, wherein the adaptive progress indicator comprises the superior variable. Computer readable storage media can include, for example, hard disk drives, CD-ROMs, and floppy disks. Additionally, the adaptive progress indicator can operate, for example, on several Hewlett-Packard® (hereinafter referred to as "HP") mainframe models, including HP J2301B, HP 2302B, HPJ2522B, HP J2523B, and HPJ230OC; and virtually any other modern desktop computer.

Variables can be expressed in terms of many types, such as percentages, time elapsed, and bytes of memory, and are all contemplated and within the scope of this invention. It should also be noted that the greater progress of variables can be a maximum value as well as a minimum value. For instance, if the progress of a search of a data repository is measured by the number of kilobytes of data left to search the data repository, and the progress of filling a display repository is measured by the number of kilobytes needed to fill the display repository, then progress is made when the variables decrease. Therefore, the greater progress between the two variables is the minimum value between the two variables. Likewise, if the progress of a search of a data repository is measured by the number of kilobytes of data repository already searched, and the progress of filling a display repository is measured by the number of kilobytes of display repository already filled, then progress is made when the two variables increase, and the greater progress between the two variables is the maximum value between the two variables.

Figure 1B:
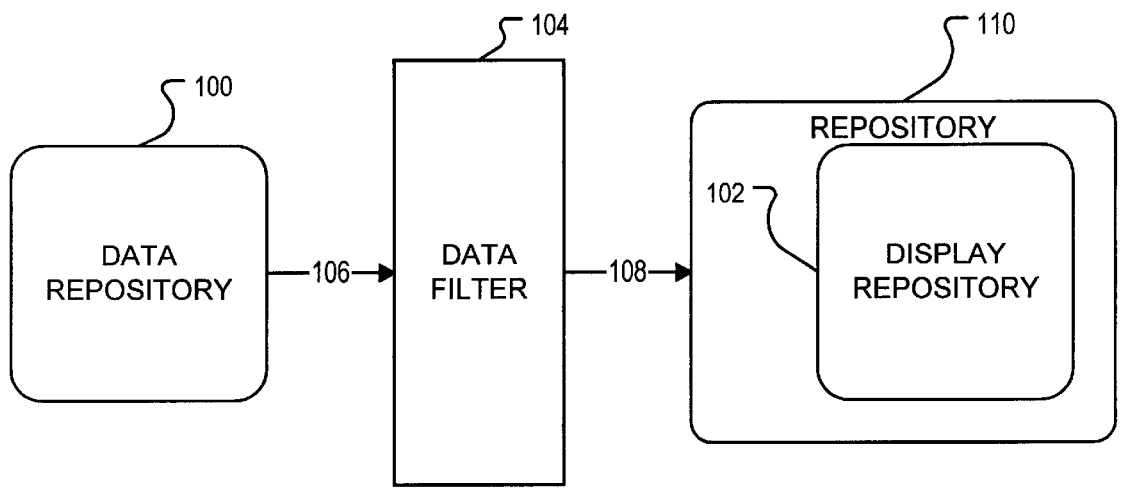
FIG. 1B illustrates a preferred embodiment, wherein a display repository is a virtual subset of a physical repository.

Throughout the specifications, variables will be expressed in terms of percentages. Also, the progress of a search of a data repository is measured by the percentage of data repository searched, and the progress of filling a display repository is measured by the percentage of display repository filled, in which case the adaptive progress indicator will display the maximum value between the two variables representing these tasks. Furthermore, a data repository 100 (FIG. 1A), such as a buffer or a database, comprises data. A display repository 102, such as a cache, comprises filtered data that is read 106 from the data repository 100 and filtered 108 through a data filter 104. A display repository 102 can be its own physical repository that collects all filtered data, as shown in FIG. 1A, or it can be a virtual subset of a repository 110 that collects all filtered data, as shown in FIG. 1B. The capacity of a display repository 102 is a configurable measurement of data for output, such as one-page display increments or 8 megabytes of data.

Figure 2:
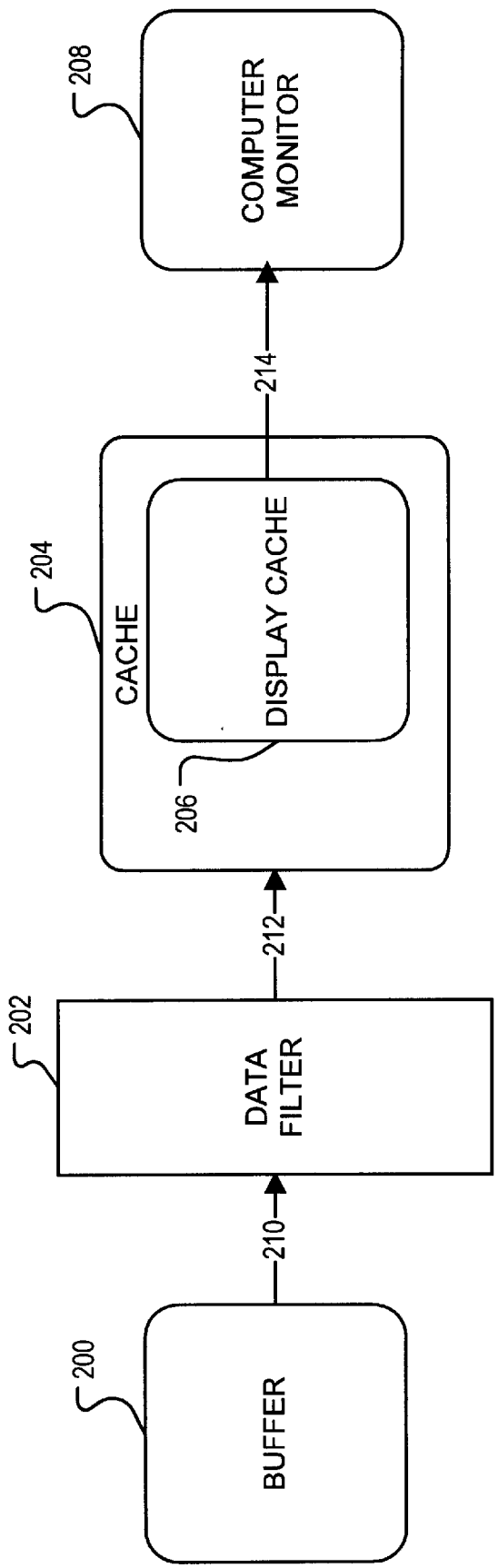
FIG. 2 illustrates a preferred embodiment, wherein a data repository is a buffer, a display repository is a display cache, and a computer monitor is used as a medium for outputting the adaptive progress indicator.

In a preferred embodiment, a buffer serves as a data repository and a display cache serves as a display repository. In this embodiment, a buffer is a region of memory that captures frames, or logical packets of information about a network connection and/or node, as defined by a user, and a display cache is a virtual subset of a repository (such as a cache where frequently used data is duplicated for quick access) that collects all filtered data. Here, two types of data filtering are supported: capture and display filtering. Capture filtering lets the user specify which frames should be stored in the buffer, and display filtering allows the user to specify which frames should be displayed. Therefore, as illustrated in FIG. 2, data filtering determines which frames should be stored in the buffer 200. This data is passed 210 to a data filter 202, where display filtering determines which information should be displayed. For example, while data filtering captures information about Node1, Node2, and Node 3, display filtering captures information about Node1 only. Filtered data is then copied 212 to a cache 204, where a display cache 206 accumulates data in one-page increments and then displays 214 the data to a computer monitor 208 each time the display cache 206 reaches a full page of display data (at which point the search temporarily halts), and when the search inquiry terminates.

Figure 3:
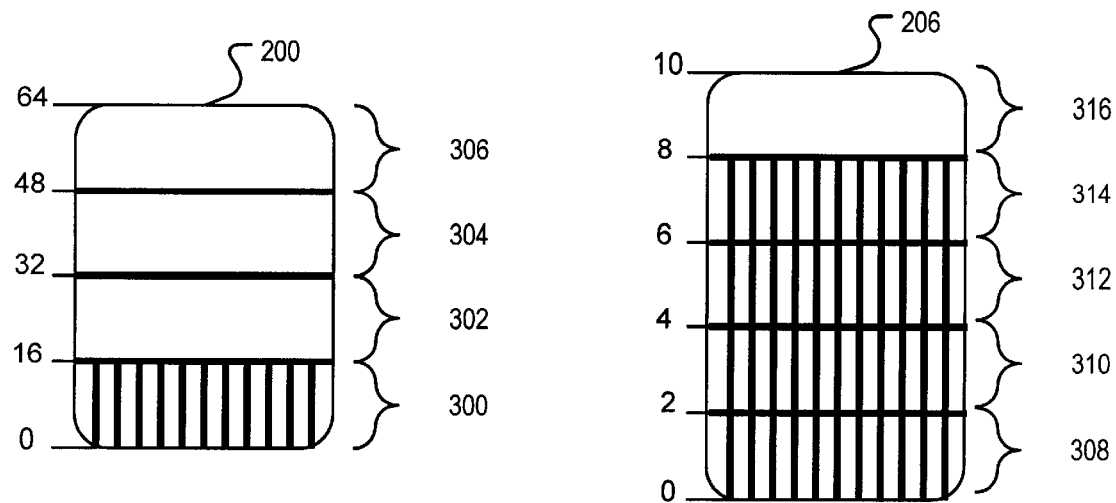
FIG. 3 illustrates a sample search inquiry in a preferred embodiment.

Existing solutions either provide the user with insufficient information to keep a user interested in a search, or too much information to make the indicator meaningful. Assume, for example, that a buffer holds 64 megabytes of information about several network connections and it takes 10 megabytes to fill a display cache. Also assume that during a search, as illustrated in FIG. 3, in the first 16 megabytes 300 of the buffer 200, 8 megabytes 308, 310, 312, 314 of pertinent data is found and copied to the display cache 206. This means that in the first 25% of buffer space searched, 80% of the display cache has been filled. If the only information provided to the user is the percentage of the buffer that has been searched, a user might lose interest in the search when the progress indicator shows the first statistic (i.e. 25% of buffer space searched). Even though the user might receive data in a relatively short amount of time, that statistic is unknown to the user, and the user might not be willing to wait around for the remaining 75% of the buffer to be searched.

Figure 4:
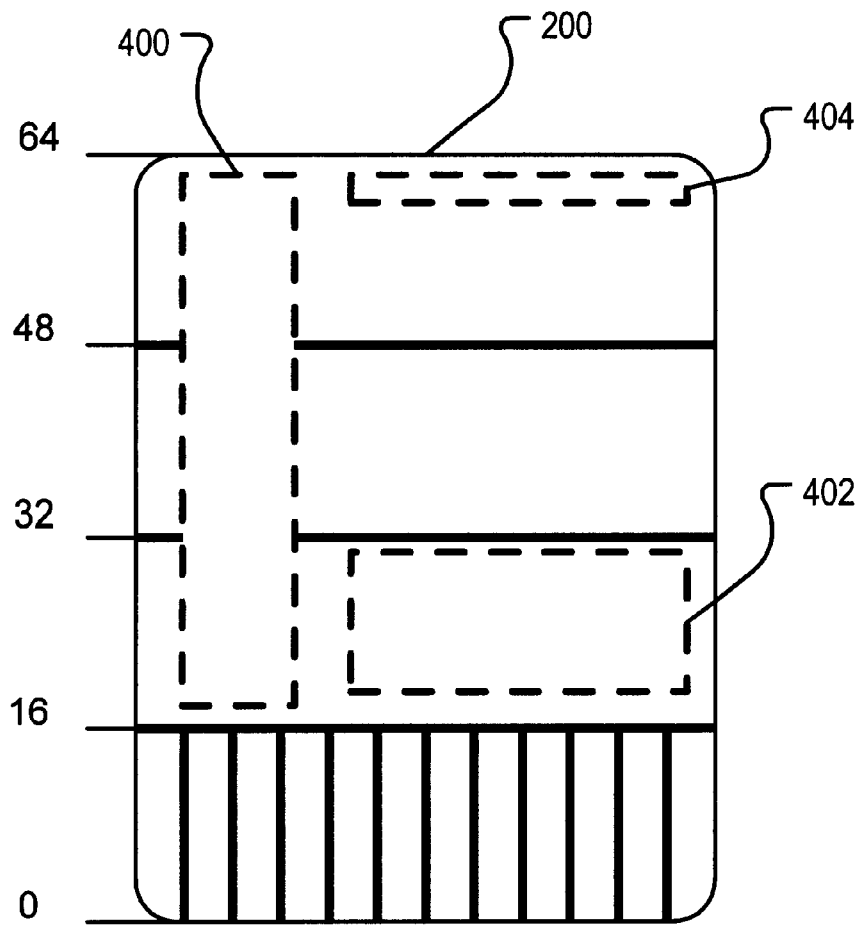
FIG. 4 illustrates pertinent data in various location patterns of a buffer in a preferred embodiment.

On the other hand, a user might wait for the remaining 20% of the display cache to be filled. Thus, a progress indicator could show the user that 80% of the display cache has been filled. In this example, a subset of the pertinent data (or all of the pertinent data) will be displayed if the search inquiry finds 2 more megabytes 316 of data (for a total of 10 megabytes, which is what is needed in this example before a display cache reaches capacity and displays it to the computer monitor) in the remaining 48 megabytes 302, 304, 306 of the buffer. This solution, however, only seems to serves its purpose if:

as illustrated in FIG. 4, the 2 megabytes of data is evenly dispersed throughout the remaining buffer 200 space 400; or the 2 megabytes of data is found in buffer 200 space that is in close proximity to where the first 8 megabytes of data was found 402.

However, if these 2 megabytes are stored in the last 5% 404, or 3.2 megabytes, of the buffer 200 space, for instance, the percentage of display cache filled variable will not change until the percentage of buffer searched variable reaches 95%. Assuming that 25% of the buffer 200 takes 15 minutes to search, the user would end up waiting 30 minutes before the search would find more pertinent data to cache, and before the percentage of display cache filled variable would change. In those 30 minutes, the user is left wondering whether the search has ended or if there has been a computer error/failure. A solution to this might be to provide the user with both variables as the search progresses, i.e. percentage of buffer searched 25%, and percentage of display cache filled 80%; percentage of buffer searched 30%, and percentage of display cache filled 82%, and so forth. While this provides the user with sufficiently informative data, a drawback to this is that the user now has the onerous task of interpreting this data in addition to the data retrieved from the search inquiry.

Figure 5:
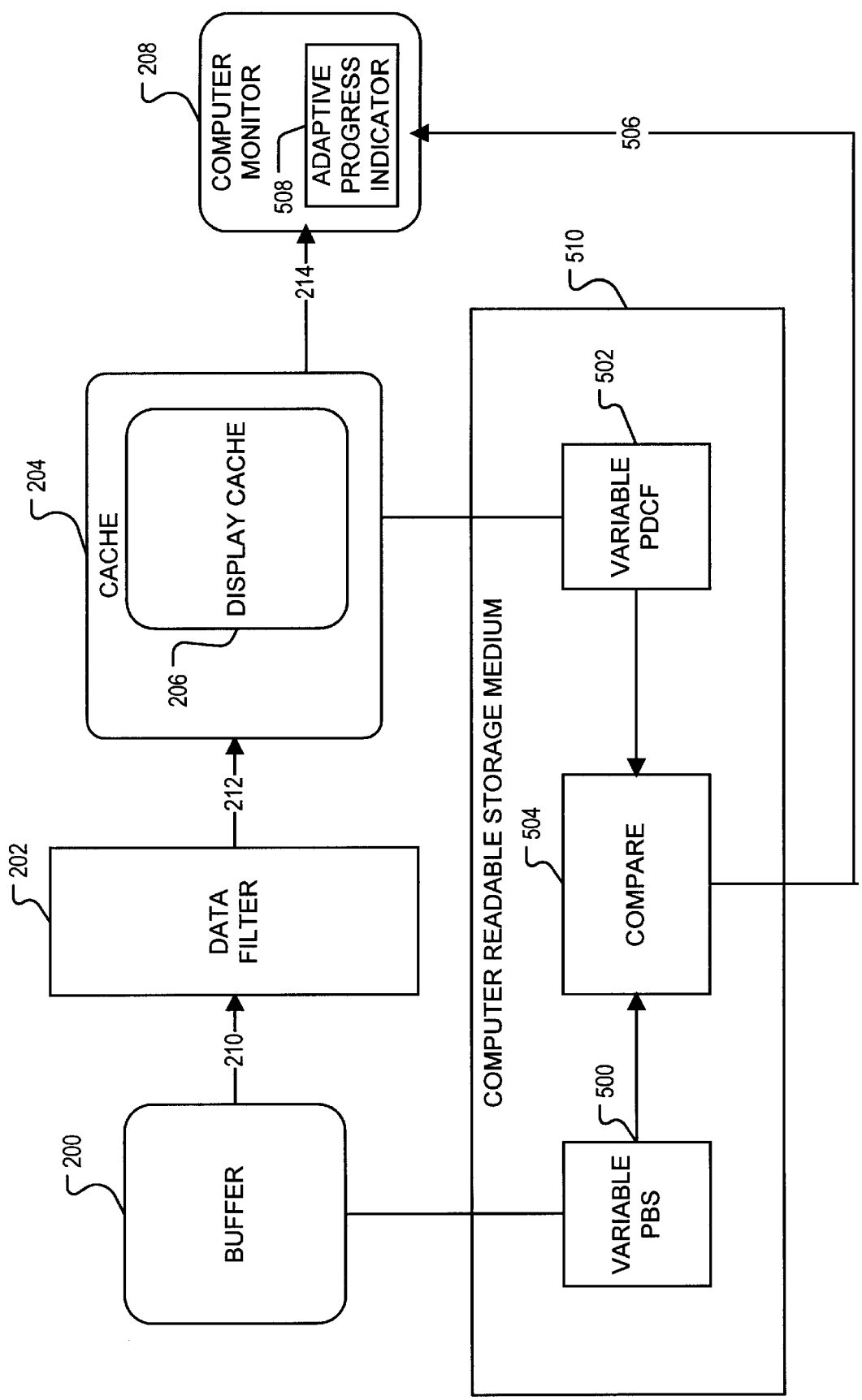
FIG. 5 illustrates the apparatus of the adaptive progress indicator in a preferred embodiment.
Figure 11:
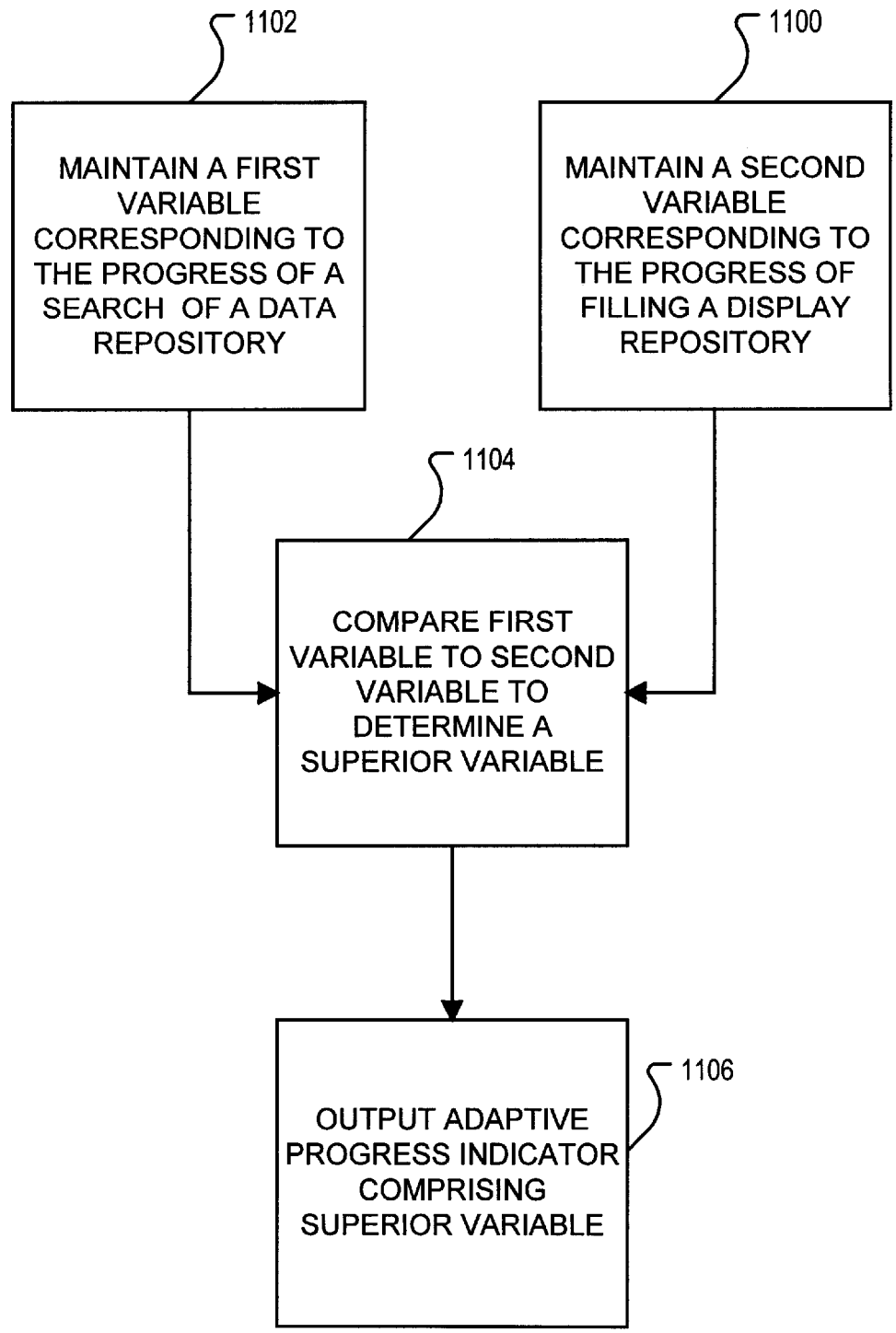
FIG. 11 illustrates the method employed by the adaptive progress indicator in a preferred embodiment.

The adaptive progress indicator provides a user with enough information to keep the user interested in a search without inundating the user with data to interpret. The adaptive progress indicator is the greater of the two variables: percentage of buffer searched (PBS) and percentage of display cache filled (PDCF). During a search, two variables are simultaneously maintained and then compared against each other as illustrated in FIG. 5. Variable PBS 500 maintains the percentage of the buffer 200 that has been searched, and variable PDCF 502 maintains the percentage of the display cache 206 that has been filled. A compare function 504 continuously compares these variables. Whereas variable PBS will constantly change because the percentage of the buffer searched will constantly increase (unless the search is temporarily halted to display a subset of pertinent data), the variable PDCF will change anywhere from zero to numerous times over the lifetime of the search. The compare function will output 506 the variable which is greater as well as any associated text, graphs, and charts that belong to that variable, which together comprise the adaptive progress indicator 508. For instance, if variable PBS is greater than PDCF, the adaptive progress indicator might read "Percentage of Buffer Searched is 80%", where 80% is variable PBS and "Percentage of Buffer Searched" is the associated text for variable PBS. This method is illustrated in FIG. 11. The maintenance of variable PDCF 1100 occurs at or about the same time with the maintenance of variable PBS 1102. The two variables are then compared 1104 to determine which variable is greater, or which is the superior variable. The adaptive progress indicator is then outputted 1106 to display the superior variable and any associated text.

Figure 6:
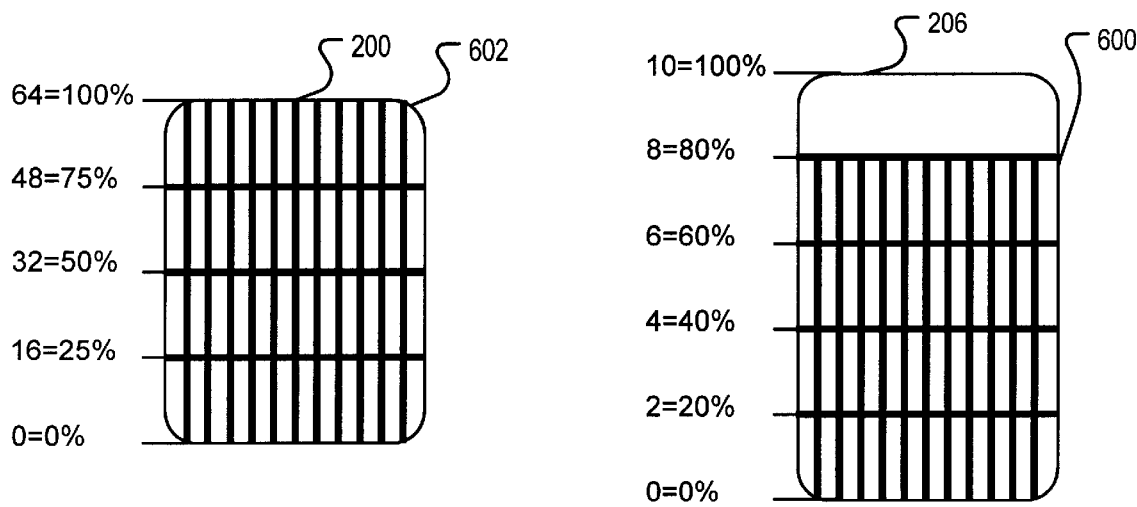
FIG. 6 illustrates an adaptive progress indicator in a preferred embodiment where the percentage of buffer searched variable reaches 100% prior to the percentage of display cache filled variable.

In the example of FIG. 3 where the percentage of buffer searched variable is 25% and the percentage of display cache filled variable is 80%, the adaptive progress indicator method would compare the two variables and then advise the user that 80% of the display cache has been filled. As any search progresses, a number of events can occur one or more times, or not at all, in this scenario prior to reaching the end of the buffer, as illustrated in FIGS. 6 through 9:

FIG. 6. The percentage of buffer searched variable 602 reaches 100% prior to the percentage of display cache filled variable 600 in which case the display cache is emptied for display to a computer monitor, and all variables are reset to 0%.

Figure 7:
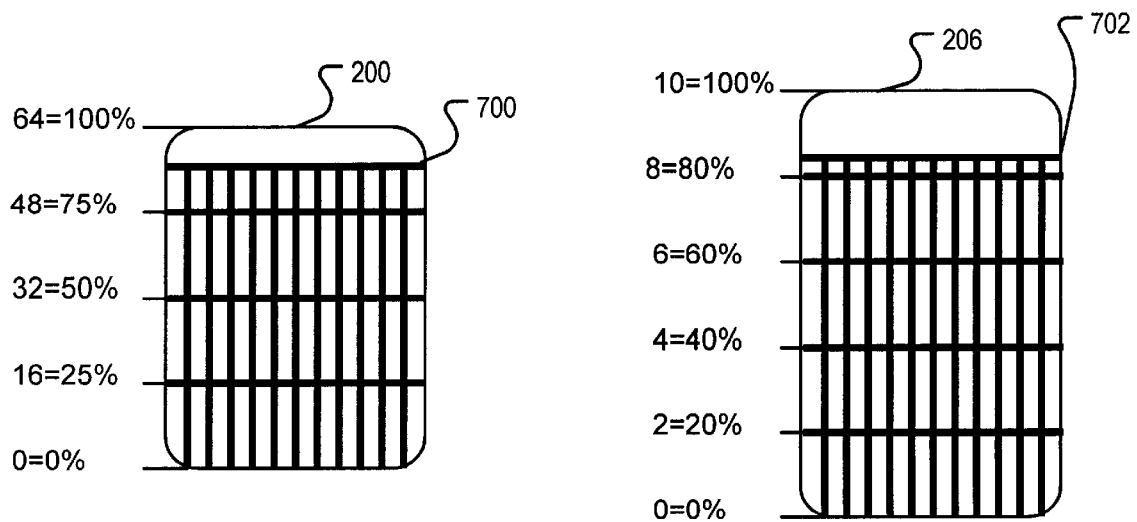
FIG. 7 illustrates an adaptive progress indicator in a preferred embodiment where the percentage of buffer searched variable exceeds the percentage of display cache filled variable as more pertinent data is found.

FIG. 7. The percentage of buffer searched variable 700 exceeds the percentage of display cache filled variable 702 as more pertinent data is found, in which case the adaptive progress indicator changes to display the percentage of buffer searched. Until the end of the buffer is reached, the adaptive progress indicator can change to reflect either a change in the percentage of the buffer searched, or a change in the percentage of display cache filled. If the percentage of display cache filled variable 702 reaches 100% prior to reaching the end of the buffer, the display cache is emptied for display to a computer monitor, and the percentage of display cache filled variable resets to 0%. Additionally, the percentage of buffer searched variable is reset to 0% because a recalculation is performed on the buffer to determine the amount of buffer left to search, so that when the search resumes (i.e. the user hits enter), both the percentage of buffer searched variable and the percentage of display cache filled variable begin at 0%. If the end of the buffer is reached prior to the percentage of display cache filled variable reaching 100%, the display cache is emptied for display to a computer monitor, and all variables are reset to 0%.

Figure 8:
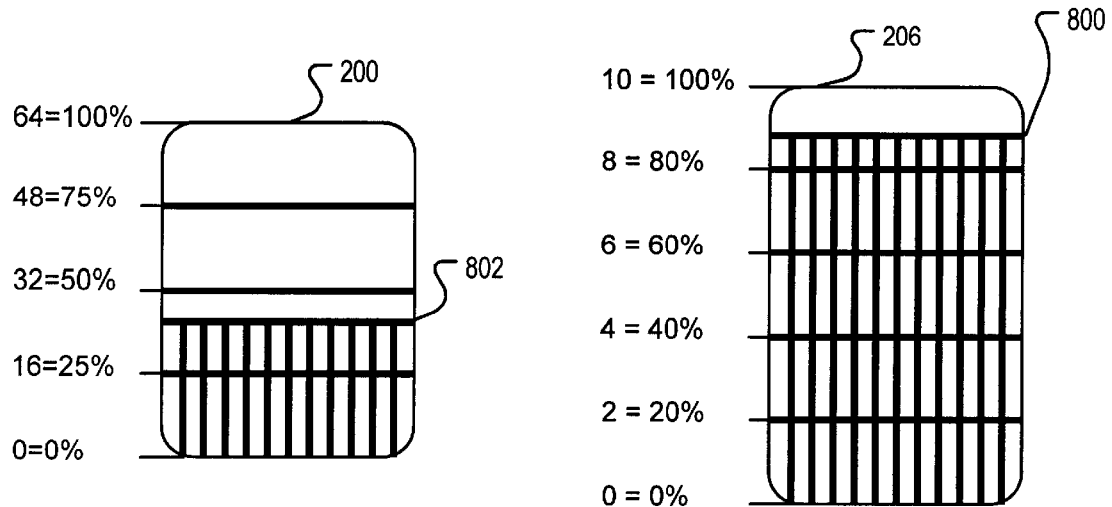
FIG. 8 illustrates an adaptive progress indicator in a preferred embodiment where the percentage of display cache filled variable exceeds the percentage of buffer searched variable as more pertinent data is found.

FIG. 8. The percentage of display cache filled variable 800 exceeds the percentage of buffer searched variable 802 as more pertinent data is found, in which case the adaptive progress indicator changes to display the percentage of display cache filled. Until the end of the buffer is reached, the adaptive progress indicator can change to reflect a either change in the percentage of the display cache filled, or a change in the percentage of buffer searched. If the percentage of display cache filled variable 800 reaches 100% prior to reaching the end of the buffer, the display cache is emptied for display to a computer monitor, and the percentage of display cache filled variable resets to 0%. Additionally, the percentage of buffer searched variable is reset to 0% because a recalculation is performed on the buffer to determine the amount of buffer left to search, so that when the search resumes (i.e. the user hits enter), both the percentage of buffer searched variable and the percentage of display cache filled variable begin at 0%. If the end of the buffer is reached prior to the percentage of display cache filled variable reaching 100%, the display cache is emptied for display to a computer monitor, and all variables are reset to 0%.

Figure 9:
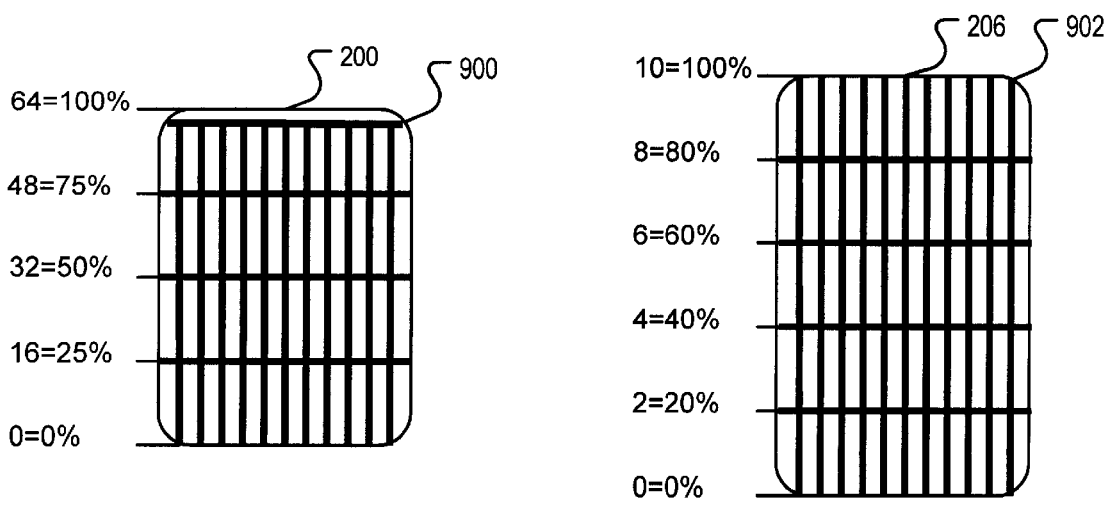
FIG. 9 illustrates an adaptive progress indicator in a preferred embodiment where the percentage of display cache filled variable reaches 100% prior to the percentage of buffer searched variable.

FIG. 9. The percentage of display cache filled variable 902 reaches 100% prior to the percentage of buffer searched variable 900, in which case the display cache is emptied for display to a computer monitor, and the percentage of display cache filled variable resets to 0%. Additionally, the percentage of buffer searched variable is reset to 0% because a recalculation is performed on the buffer to determine the amount of buffer left to search, so that when the search resumes (i.e. the user hits enter), both the percentage of buffer searched variable and the percentage of display cache filled variable begin at 0%.

When the entire buffer has been searched, the adaptive progress indicator can indicate that 100% of the buffer has been searched, or be omitted from the display. The apparatus and method of the adaptive progress indicator is thus a simple yet effective solution to keeping a user interested in a search without burdening the user with various data to interpret and congesting the display.

Figure 10:
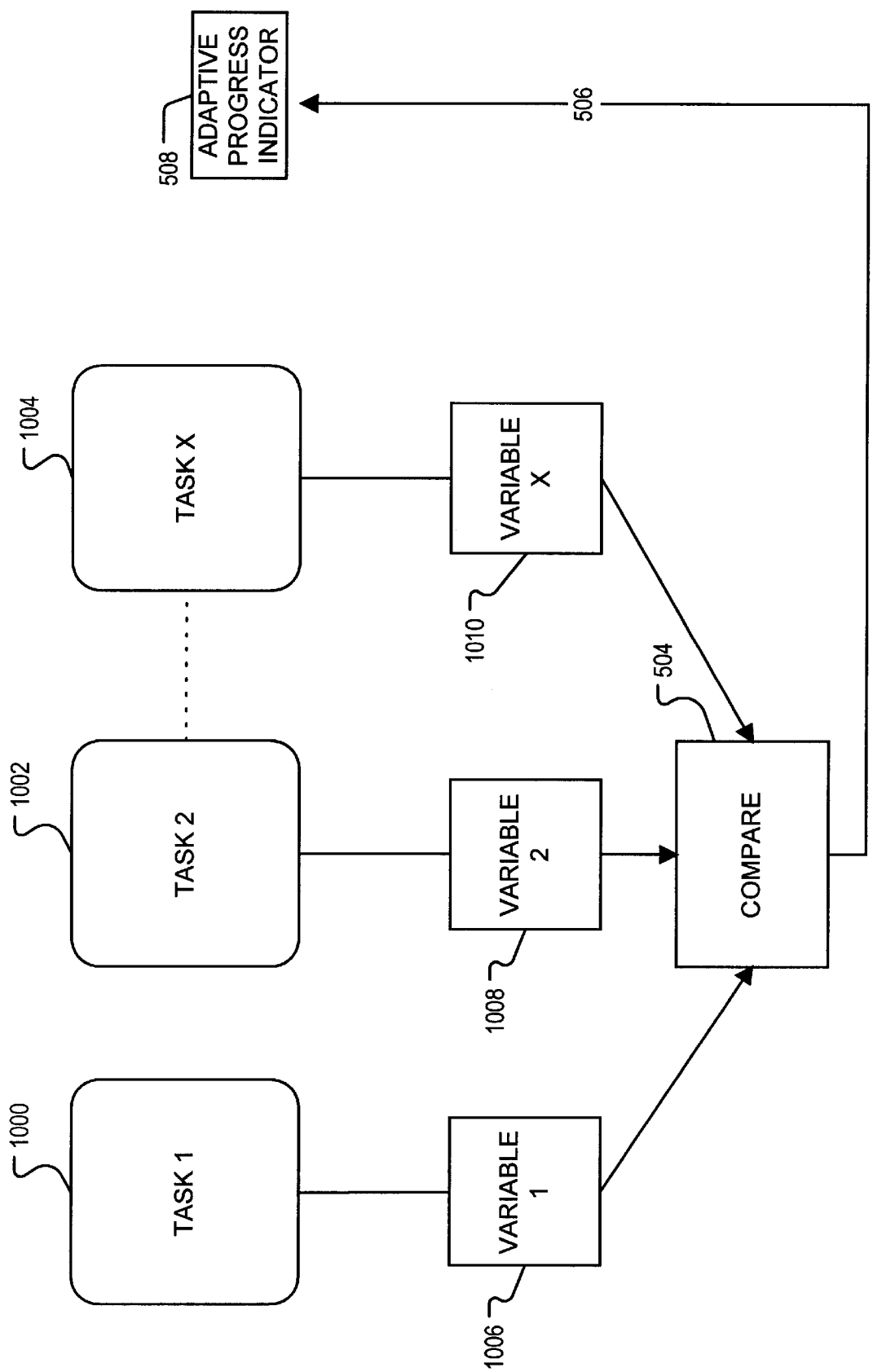
FIG. 10 illustrates the apparatus of the adaptive progress indicator in a second embodiment.
Figure 12:
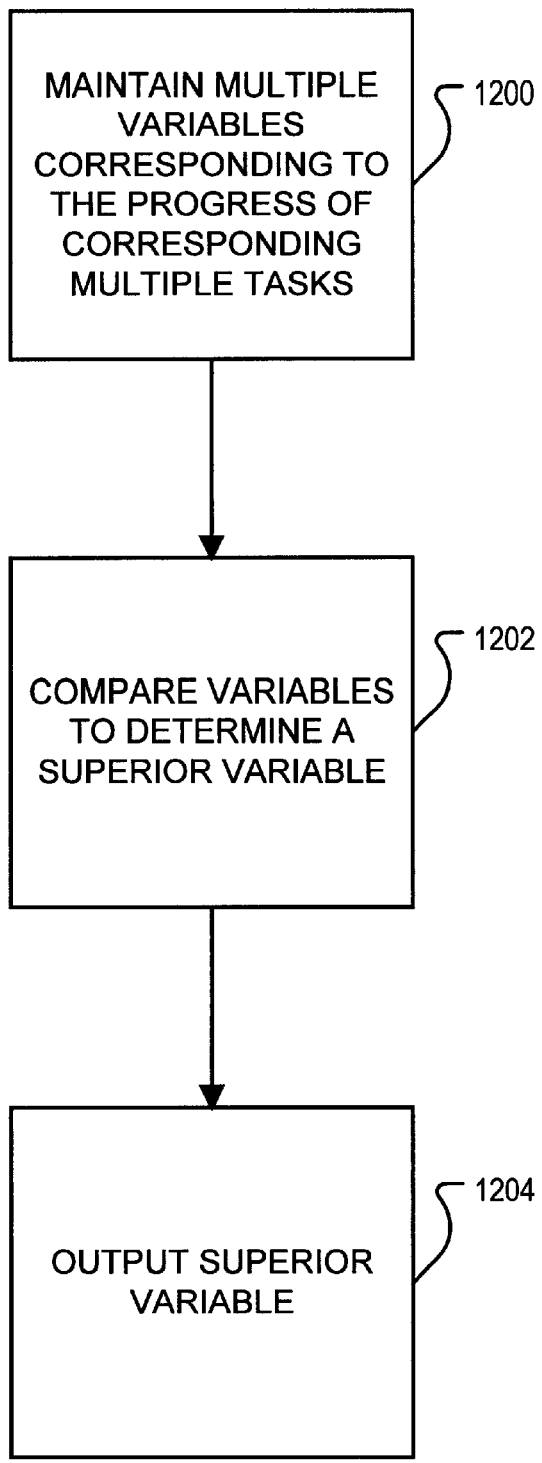
FIG. 12 illustrates the method employed by the adaptive progress indicator in a second embodiment.

In a preferred embodiment as described above, the adaptive progress indicator is employed to inform the user of the status of a computer operation having two concurrent tasks: that is, a search inquiry with a first task of searching through a data repository and a second task of filling up a display repository. In a second embodiment, as illustrated in FIG. 10, the adaptive progress indicator can be employed to inform a user of the status of any computer operation having multiple (i.e., more than one) concurrent tasks 1000, 1002, 1004. For example, where the computer operation is a network system backup, a first variable can represent the progress of backing up Computer1, a second variable can represent the progress of Computer2, a third variable can represent the progress of Computer3, and so forth. This would comprise of maintaining multiple variables 1006, 1008, 1010, wherein each variable represents a particular task 1000, 1002, 1004 to indicate the progress of the corresponding task; comparing 504 the multiple variables to determine a superior variable, wherein the superior variable is the variable that is selected based upon at least one predetermined performance criterion; and outputting 506 an adaptive progress indicator 508 during the computer operation, wherein the adaptive progress indicator comprises the superior variable. This method is illustrated in FIG. 12. Multiple variables representing corresponding tasks are maintained 1200 and then compared 1202 to determine a superior variable which is selected based upon at least one predetermined criterion. The superior variable is then outputted 1204.

The superior variable may, of course, be selected based upon any predetermined criterion or criteria. In the above examples, the superior variable was the variable which was currently most complete. In other embodiments, the superior variable can be otherwise selected. For example, the superior variable can be the least complete variable, the most rapidly changing variable, or the slowest changing variable. Each variable can be based upon multiple criteria, such as speed and acceleration of task completion, weighted equally or in some other predetermined manner.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for informing a user of the status of a search inquiry, comprising:
    a. maintaining a first variable that corresponds to the progress of a search of a data repository during a search inquiry, wherein said data repository comprises data;
    b. maintaining a second variable that corresponds to the progress of filling a display repository during said search inquiry wherein said display repository comprises data from said data repository, and the capacity of said display repository is equal to a configurable measurement of data for output;
    c. comparing said first variable and said second variable to determine a superior variable, wherein said superior variable is the one of said first variable or said second variable that indicates greater progress; and
    d. outputting an adaptive progress indicator at least once during said search inquiry, wherein said adaptive progress indicator comprises said superior variable.

2. A method as in claim 1, wherein said adaptive indicator outputted during said search inquiry additionally comprises one or more descriptions associated with said superior variable.

3. A method as in claim 1, wherein said greater progress is the maximum value between said first variable and said second variable.

4. A method as in claim 1, wherein said first variable and said second variable are expressed in terms of percentages.

5. A method as in claim 1, wherein said data from said display repository is:
    a. a subset of data that is copied from said data repository; and
    b. filtered data, and said filtered data is data that is pertinent to said search inquiry as determined by a data filter.

6. A method as in claim 1, wherein said adaptive progress indicator is outputted for display to a computer monitor.

7. A method as in claim 1, wherein said display repository is a virtual subset of a repository that comprises filtered data read from said data repository, and said filtered data is data that is pertinent to said search inquiry as determined by a data filter.

8. A method as in claim 1, wherein said configurable measurement of data for output equals one viewable page of display to a computer monitor.

9. A method as in claim 1, wherein:

a. said data repository is a buffer; and b. said display repository is a display cache.

10. An article of manufacture, comprising:

a. one or more computer readable storage media; and b. computer readable program code embodied on said one or more computer readable storage media for informing a user of the status of a search inquiry, the computer readable program code:

i. causing a computer to maintain a first variable that corresponds to the progress of a search of a data repository, wherein said data repository comprises data;

ii. causing said computer to maintain a second variable that corresponds to the progress of filling a display repository, wherein said display repository comprises data from said data repository, and the capacity of said display repository is equal to a configurable measurement of data for output;

iii. causing said computer to compare said first variable and said second variable to determine a superior variable, wherein said superior variable is the one of said first variable or said second variable that indicates greater progress; and iv. causing said computer to output an adaptive progress indicator at least once during said search inquiry that comprises said superior variable.

11. An article of manufacture as in claim 10, wherein said adaptive progress indicator additionally comprises one or more descriptions associated with said greater of said first variable and said second variable that distinguishes said first variable from said second variable.

12. An article of manufacture as in claim 10, wherein said greater progress is the maximum value between said first variable and said second variable.

13. An article of manufacture as in claim 10, wherein said first variable and said second variable are expressed in terms of percentages.

14. An article of manufacture as in claim 10, wherein said data from said display repository is:

a. a subset of data that is copied from said data repository; and b. filtered data, and said filtered data is data that is pertinent to said search inquiry as determined by a data filter.

15. An article of manufacture as in claim 10, wherein said adaptive progress indicator is outputted for display to a computer monitor.

16. An article of manufacture as in claim 10, wherein said display repository is a virtual subset of a repository that comprises filtered data read from said data repository, and said filtered data is data that is pertinent to said search inquiry as determined by a data filter.

17. An article of manufacture as in claim 10, wherein said configurable measurement of data for output equals one viewable page of display to a computer monitor.

18. An article of manufacture as in claim 10, wherein:

a. said data repository is a buffer; and b. said display repository is a display cache.

* * * * *